(12) United States Patent
Ellinger

(10) Patent No.: US 6,334,765 B1
(45) Date of Patent: Jan. 1, 2002

(54) INJECTION MOLDING MACHINE HAVING A C-FORM FRAME

(75) Inventor: Alfred Ellinger, Perg (AT)

(73) Assignee: Engel Maschinenbau Gesellschaft m.b.H., Schwertberg (AT)

( * ) Notice: Subject to any disclaimer, the term of this patent is extended or adjusted under 35 U.S.C. 154(b) by 0 days.

(21) Appl. No.: 09/418,450

(22) Filed: Oct. 15, 1999

(30) Foreign Application Priority Data

Oct. 21, 1998 (AT) ........................................ 688/98

(51) Int. Cl.⁷ .................................................. B29C 45/77
(52) U.S. Cl. ..................... 425/149; 425/167; 425/589
(58) Field of Search ............................ 425/145, 149, 425/589, 167

(56) References Cited

U.S. PATENT DOCUMENTS

| | | | |
|---|---|---|---|
| 3,345,691 A | 10/1967 | Aoki | |
| 3,840,313 A | * 10/1974 | Grundmann et al. | 425/167 |
| 4,326,255 A | * 4/1982 | Fujita | 425/145 |
| 5,297,952 A | 3/1994 | Leonhartsberger | |
| 5,342,559 A | 8/1994 | Kamiguchi et al. | |
| 5,536,166 A | * 7/1996 | Schad | 425/589 |
| 5,633,024 A | * 5/1997 | Ziv-Av | 425/589 |
| 5,980,793 A | * 11/1999 | Hehl | 425/149 |

FOREIGN PATENT DOCUMENTS

| | | |
|---|---|---|
| AT | 356831 B | 5/1980 |
| DE | 684536 | 11/1939 |
| DE | 4230348 | 3/1993 |
| DE | 19510488 | 3/1996 |
| EP | 0188000 | 7/1986 |

* cited by examiner

Primary Examiner—Tim Heitbrink
(74) Attorney, Agent, or Firm—Notaro & Michalos P.C.

(57) ABSTRACT

Injection molding machine for thermoplastic synthetic synthetic materials, with a substantially C-form frame which is bent open by the closing force generated between the mold halves borne by a stationary and a movable mold platen (6,7), wherein for determining the closing force a distance measuring device (11,13) senses the bending-open of at least one limb of the C-form frame (1).

7 Claims, 5 Drawing Sheets

INJECTION MOLDING MACHINE HAVING A C-FORM FRAME

FIELD AND BACKGROUND OF THE INVENTION

The invention relates to an injection molding machine for thermoplastic synthetic materials, with a substantially C-form frame which is bent open by the closing force generated by a closure device between the mold halves supported by a stationary and a movable mold platen. The invention further relates to an injection unit for an injection molding machine, with a melting cylinder and a screw disposed therein rotatably and axially displaceably by a crank drive, wherein one or several cranks of the crank drive engage a head bearing in which the screw or a shaft connected therewith is supported rotatably but fixed in the axial direction.

In hydraulic injection molding machines the movable mold platen and the screw are axially displaced via hydraulic cylinders. The closing force and the injection pressure can therefore be determined in simple manner directly from the applied hydraulic pressures.

In electric injection molding machines in which the driving of the closure device and of the injection unit is carried out by electric motors, such hydraulic pressures are not available. U.S. Pat. No. 5,536,166 therefore proposes to determine the closing force in an injection molding machine in which the movable and the stationary mold platen are connected with bars by means of a wire resistance strain gauge based on the local extension of such a bar. But since the closing force can thereby be only ascertained with gross imprecision, furthermore the published Austrian patent application A 873/97 proposes providing an hydraulic cushion in the path of the force transmission of the closure device such that the closing force can again be determined on the basis of an hydraulic pressure measurement. Such a construction, of course, entails large expenditures.

In order to be able to determine the injection pressure in an electric injection unit, it was proposed to provide a pressure sensor in the screw chamber itself. However, due to the adverse external conditions in this region, such a sensor is subject to extreme stress and, accordingly, is susceptible to errors and, due to its special construction, is expensive.

It is the task of the invention to make available devices for determining the closure force and/or the injection pressure which are, in particular, suitable for electric injection pressure which are, in particular, suitable for electric injection molding machines and permit the simple and precise determination of these parameters.

According to the invention this is achieved with an injection molding machine of the above described type thereby that for determining the closing force a distance measuring device senses the bending-open of at least one of the limbs of the C-form frame. In an injection unit of the above described type this is accomplished thereby that for determining the injection pressure a distance measuring device senses the displacement of the screw or of the shaft connected therewith.

Thus the fundamental idea of the invention comprises sensing the integral deformation of a part stressed by the particular force via a distance measuring device and to determine on that basis the corresponding force or the corresponding pressure, respectively.

BRIEF DESCRIPTION OF THE DRAWINGS

Further advantages and details of the invention will be explained in the following with reference to the enclosed drawing. Therein depict.

DESCRIPTION OF THE PREFERRED EMBODIMENTS

Figure 1:
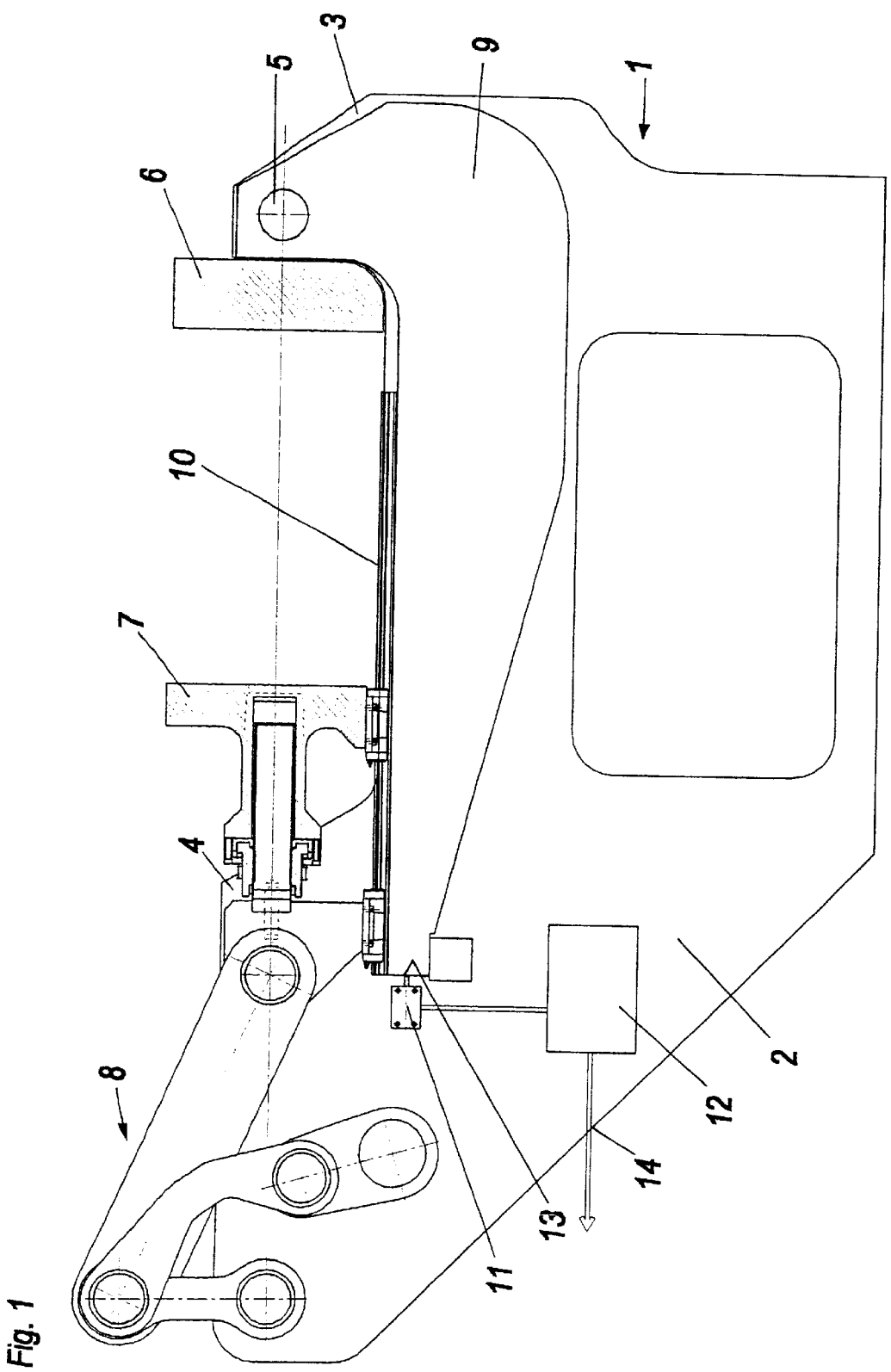
FIG. 1 a schematic longitudinal section through an electric injection molding machine corresponding to line A—A of FIG. 2, FIG. 2 the injection molding machine of FIG. 1, with the movable mold platen in the forwardmost position, FIG. 3 a schematic cross section along line B—B of FIG. 1, FIG. 4 a schematic longitudinal section through an injection unit, and FIG. 5 an enlarged segment of the injection unit of FIG. 4.
Figure 2:
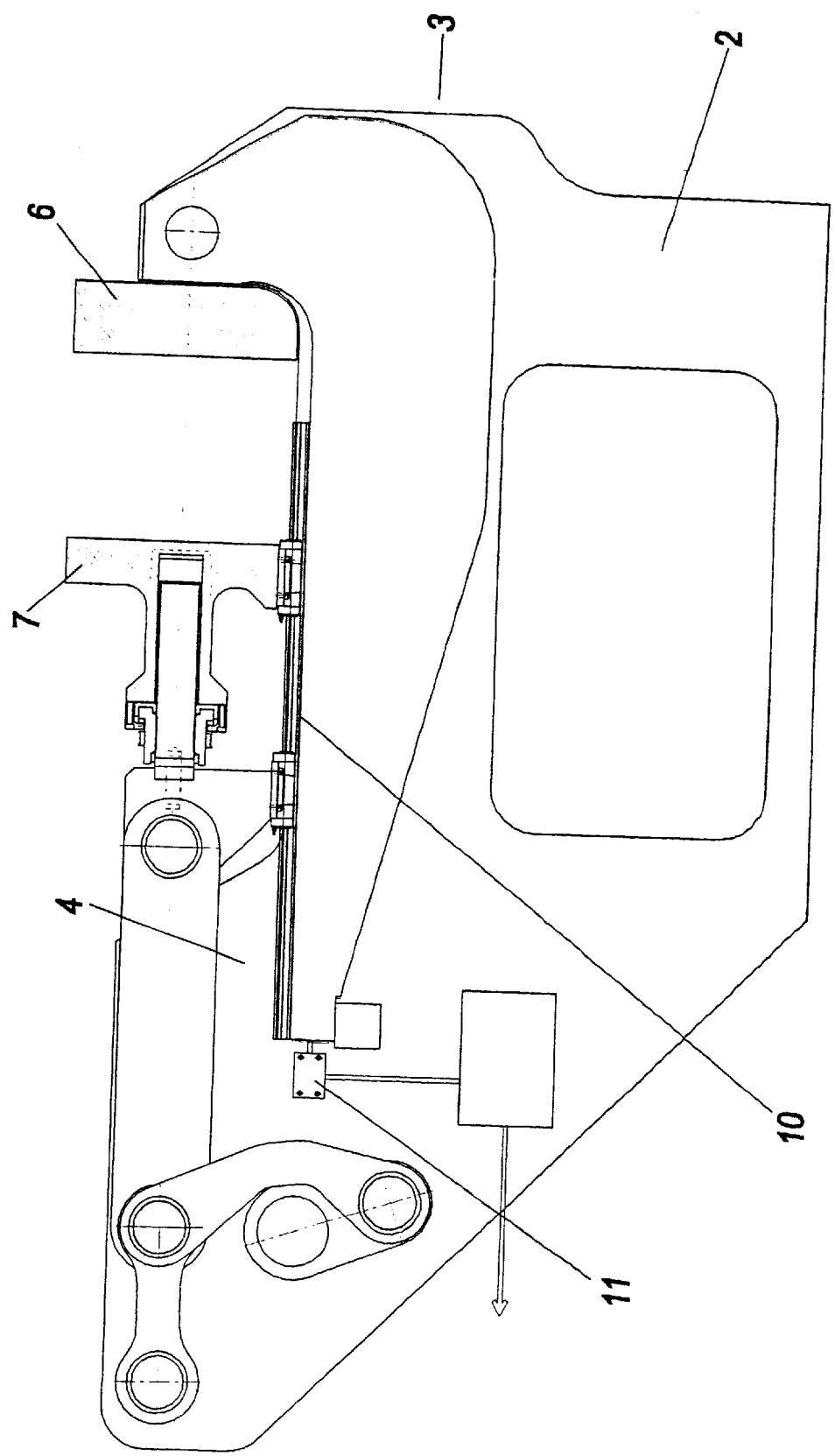
Figure 3:
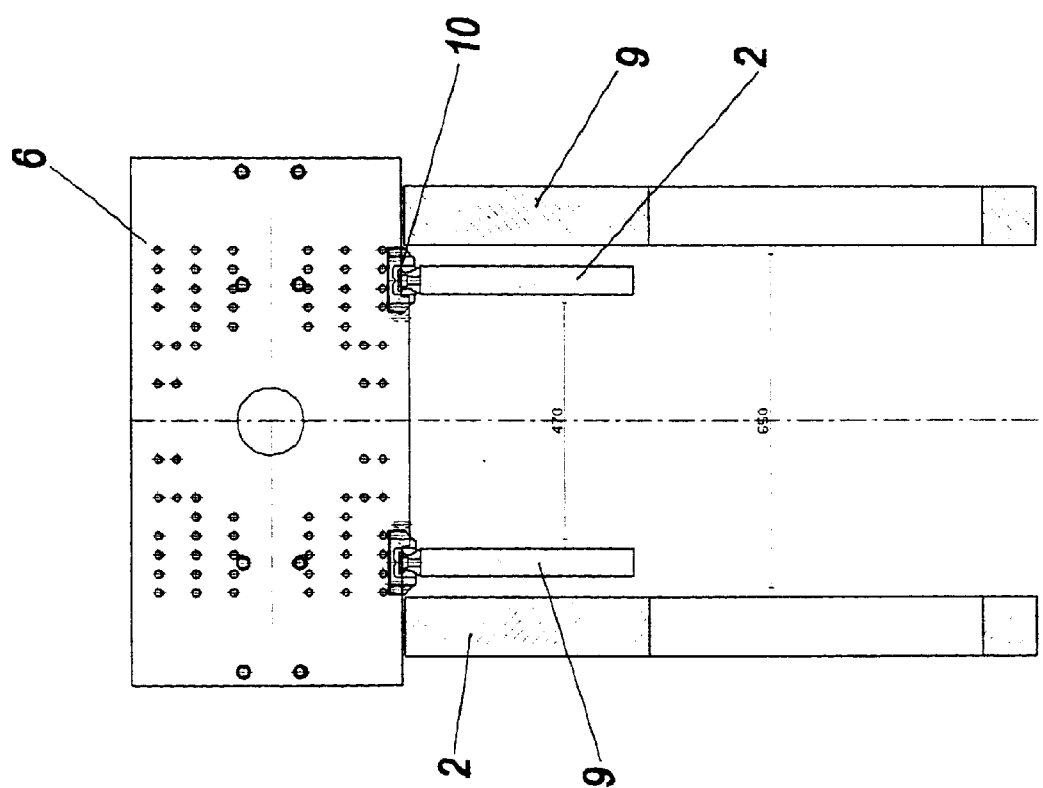

The injection molding machine depicted in FIGS. 1 to 3 comprises a substantially C-form frame 1 with a base portion 2 and limbs 3,4. The stationary mold platen 6 is disposed on limb 3 via an articulation 5 and the movable mold platen 7 is connected via an articulated lever mechanism 8 with the limb 4 of the C-form frame. The articulated lever mechanism 8 forms a portion of the closure device for mold halves (not shown) disposed on the mold platen 6,7 and is driven by an electric motor, not shown in FIGS. 1 to 3, via a corresponding gearing.

Also pivotably supported about the articulation 5 is an L-form bracket 9 which is rigidly connected with the stationary mold platen 6. The bracket 9 carries guide rails 10 on which the movable mold platen 7 is displaceable. The L-form bracket thus effects a parallel alignment of the platen 6, 7. Due to the articulated connection 5 of the stationary mold platen 6 with limb 3 of the frame as well as the articulated connection, mediated via the articulated lever mechanism 8, of the movable mold platen 7 with limb 4 of the frame, the parallel alignment between the mold platen 6, 7 is also maintained during the application of the closing force if the C-form frame is elastically deformed and the limbs 3, 4 are bent open.

Such bar-less injection molding machines are adequately known. Further explanations of details of such an injection molding machine are therefore not required here.

To determine the closing force, a distance measuring device or sensor 11 is provided according to the invention which senses the bending-open of limb 3 of the C-form frame 1 when the closing force is applied. The L-form bracket 9 serves as transmission component which itself is unstrained by the closing force and which transmits the bending-open of the limb 3 of the contact-free sensor 11 which opposes the free end 13 of the L-form bracket 9 and is disposed on the base portion 2 of the C-form frame 1 in the region in which, onto the latter, the other limb is formed. When applying the closing force the limb 3 is bent open somewhat toward the outside such that the free end 13 of the bracket 9 moves somewhat away form the sensor (in the $\mu$m range). The output signal of sensor 11 is potentially supplied via an amplifier to a regulating device 12 for the closing force, which, via the output line, correspondingly drives the motor driving the articulated lever mechanism.

In principle it would also be conceivable and possible to dispose the sensor 11 on the limb 4 such that the sum of the bending-open of both limbs 3, 4 is drawn on for determining the closing force. Different types of contact-free displacement transducers are possible for use as sensors 11, for example inductive sensors or laser sensors.

Figure 4:
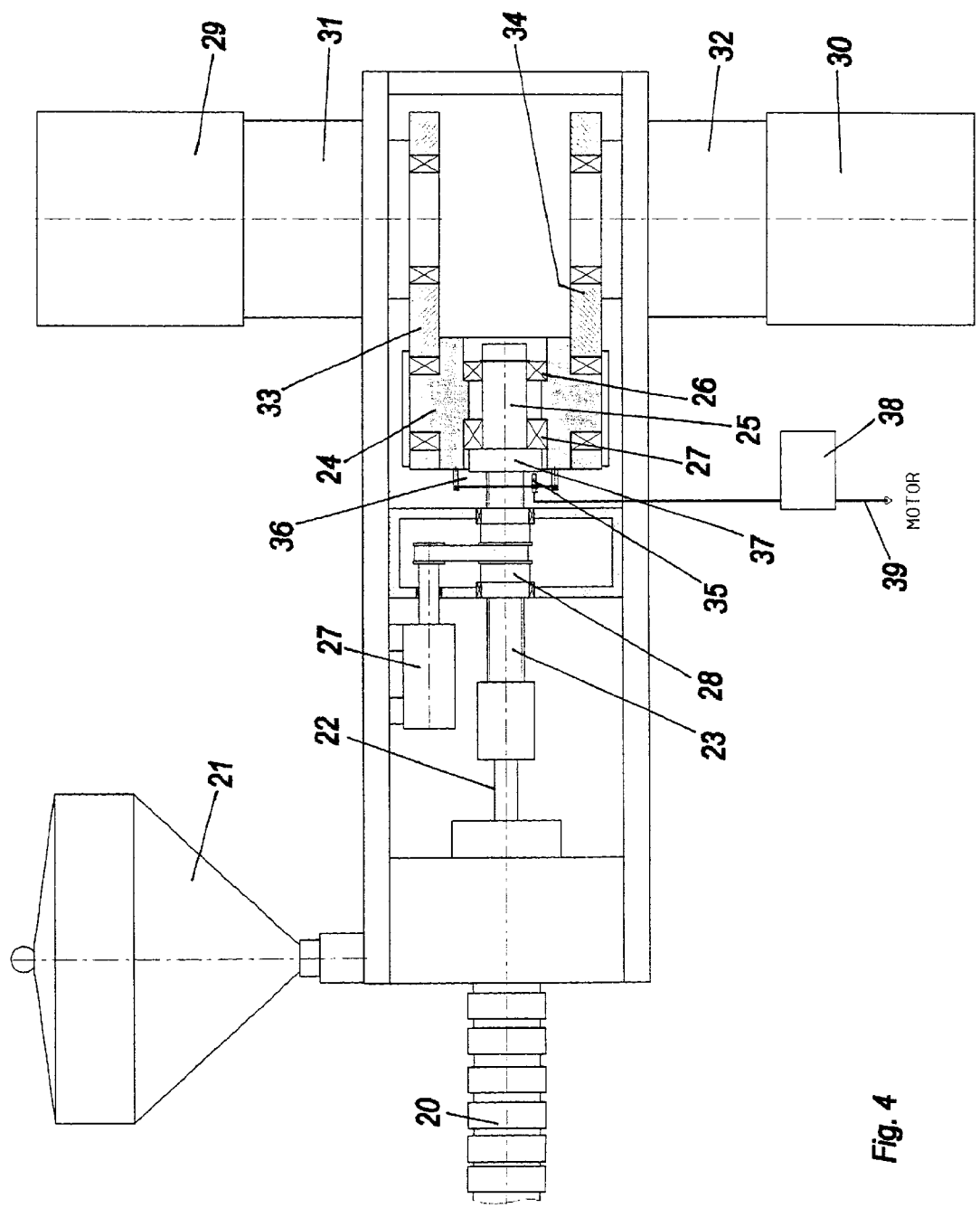
Figure 5:
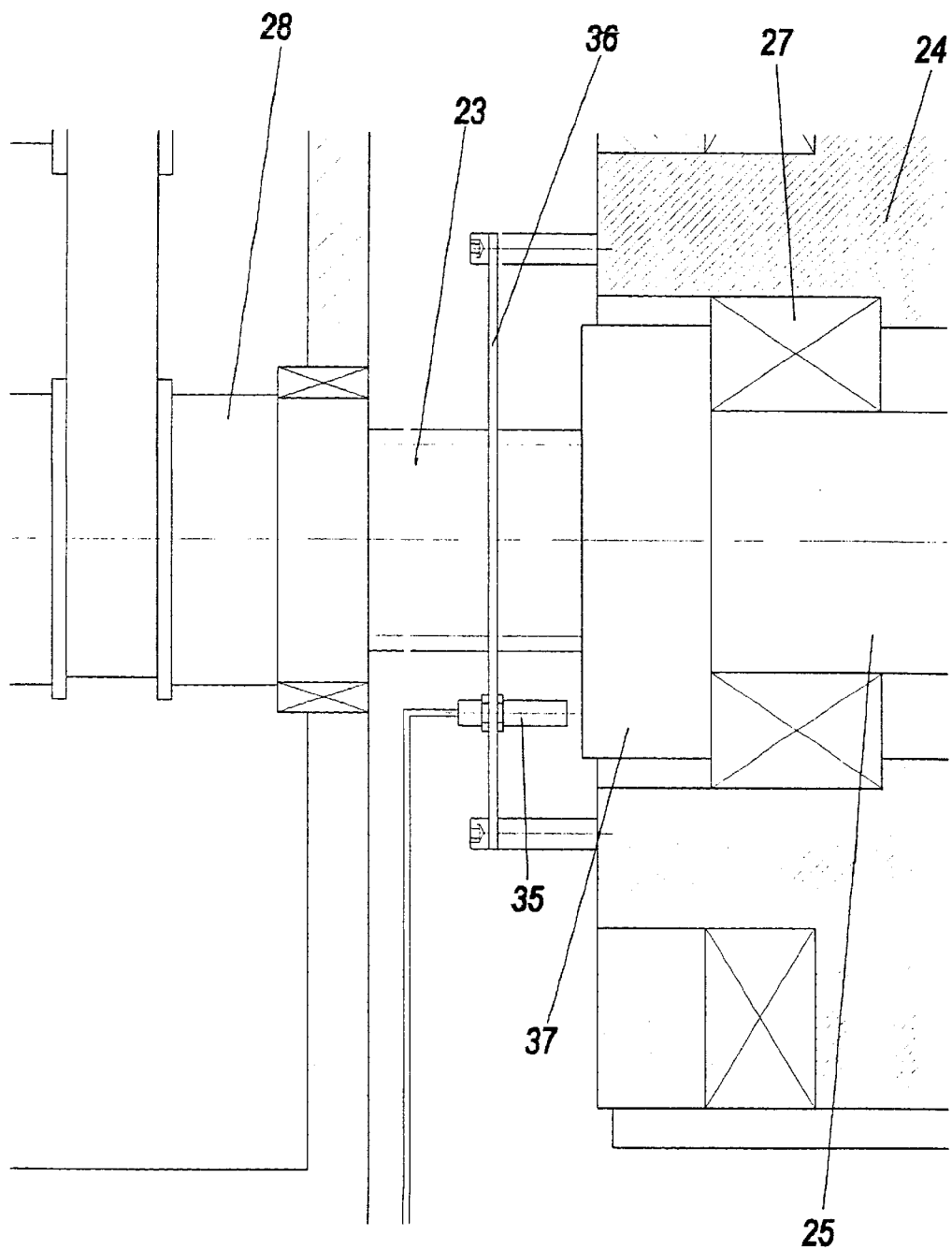

The injection unit shown in FIGS. 4 and 5 comprises a melting cylinder 20 (only its rear portion is shown), to which the material to be melted can be supplied through a funnel 21 and in which a melting screw 22 is disposed rotatably and axially displaceably. The melting screw 22 is connected at its rear end with a splined shaft 23 which, in turn, is rigidly connected with a shaft 25 supported in a head bearing 24. The shaft 25 is supported rotatably but axially fixed in the head bearing 27 via bearings 26, 27 of which the bearing 27 is preferably implemented as axially self-aligning roller bearing.

To rotate the screw during the melting phase, a driving motor 27 (also FIG. 4) is provided which rotates a portion 28 which is supported opposite the splined shaft 23 stationarily but displaceably on it. After the melting process the injection process takes place via a crank drive. For this purpose are provided servomotors 29,30, which via gearing 31,32 and cranks 33,34 displace the head bearing 24 in the axial direction of the screw.

Such injection units are adequately known within prior art and therefore here no further details of such an injection unit will be described.

For determining the injection pressure according to the invention, a distance measuring device 35, 36, 37 is provided which senses the displacement of shaft 25 in the head bearing 24 when the injection force is applied via the servomotors 29, 30. Onto the shaft 25 is formed a shaft collar 37 which is opposed by a sensor 35 connected with the head bearing 24 via a bearing bracket 36. During the application of the injection force the bearing 27 is deformed corresponding to the magnitude of this force whereby the distance between sensor 35 and shaft collar 37 is changed slightly. This distance change is supplied to a regulation device 38 which, corresponding to the desired injection pressure, drives the servomotors 29, 30 via the output line 39.

What is claimed is:

1. Injection molding machine for thermoplastic synthetic materials, with a substantially C-form frame which is bent open by the closing force which is generated by a closure device between the mold halves borne by a stationary and a movable mold platen, characterized in that for determining the closing force a distance measuring device (11,13) senses the bending-open of at least one limb of the C-form frame (1).

2. Injection molding machine as claimed in claim 1, characterized in that the distance measuring device (11, 13) comprises a transmission component (9) unstrained by the closing force, whose one end is connected with one of the limbs (3) of the C-form frame and whose other end (13) opposes a sensor (11) acquiring the displacement of this transmission component.

3. Injection molding machine as claimed in claim 2, characterized in that the sensor (11) is disposed the base portion (2) of the C-form frame in the region in which onto the latter the other limb (4) is formed.

4. Injection molding machine as claimed in claim 1, characterized in that the driving of the closing device takes place through one or several electromotors.

5. Injection molding machine as claimed in claim 1, characterized in that the distance measuring device comprises a contact-free sensor (11).

6. Injection molding machine as claimed in claim 1, characterized in that the output signal of the sensor (11) of the distance measuring device is supplied to a regulating device (12) for the closing force.

7. Injection unit for an injection molding machine, with a melting cylinder and a screw disposed therein rotatably and axially displaceably through a crank drive, wherein one or several cranks of the crank drive engage a head bearing in which the screw, or a shaft connected therewith, is supported rotatably but fixed in the axial direction, characterized in that for determining the injection pressure a distance measuring device (35, 36, 37) senses the displacement of the screw (22), or of the shaft (25) connected therewith, relative to the head bearing (24).

* * * * *